(12) United States Patent
Wurman et al.

(10) Patent No.: US 6,377,204 B1
(45) Date of Patent: Apr. 23, 2002

(54) RADAR SYSTEM HAVING MULTIPLE SIMULTANEOUSLY TRANSMITTED BEAMS OPERATING IN A SCANNING MODE TO IDENTIFY SCATTERERS

(75) Inventors: Joshua Michael Wurman, Norman, OK (US); Mitchell Alfred Randall, Boulder, CO (US)

(73) Assignee: University Corporation for Atmospheric Research, Boulder, CO (US)

(*) Notice: Subject to any disclaimer, the term of this patent is extended or adjusted under 35 U.S.C. 154(b) by 0 days.

(21) Appl. No.: 09/460,039

(22) Filed: Dec. 13, 1999

(51) Int. Cl.$^7$ .......................... G01S 13/00; G01S 13/95
(52) U.S. Cl. ...................... 342/59; 342/26; 342/74; 342/75; 342/81; 342/147; 342/158
(58) Field of Search ............... 342/26, 27, 28, 342/59, 104, 115, 118, 147, 175, 189–197, 120–133, 148–158, 74–81

(56) References Cited

U.S. PATENT DOCUMENTS

| | | | |
|---|---|---|---|
| 4,649,388 A | * | 3/1987 | Atlas ........................... 342/26 |
| 4,748,448 A | * | 5/1988 | Thompson .................... 342/26 |
| RE33,152 E | * | 1/1990 | Atlas ........................... 342/26 |
| 5,130,712 A | | 7/1992 | Rubin et al. |
| 5,175,551 A | | 12/1992 | Rubin |
| 5,262,782 A | | 11/1993 | Rubin et al. |
| 5,359,330 A | | 10/1994 | Rubin et al. |
| 5,394,155 A | | 2/1995 | Rubin et al. |
| 5,410,314 A | | 4/1995 | Frush et al. |
| 5,442,359 A | | 8/1995 | Rubin |
| 5,451,961 A | | 9/1995 | Rubin et al. |
| 5,907,568 A | * | 5/1999 | Reitan, Jr. ................... 342/26 |

* cited by examiner

Primary Examiner—Bernarr E. Gregory

(57) ABSTRACT

The multiple beam radar system uses multiple simultaneously transmitted beams of high frequency energy to identify scatterers that are located in a predetermined volume of space. This multiple beam radar system simultaneously transmits several beams of high frequency energy, produced by an antenna which operates in a mechanically scanning mode, and simultaneously receives the returned radiation, which constitutes components of this narrow beam that have been reflected off scatterers located in the path of the beam. The transmitted (and thus received) frequency of each beam is different, providing information relating to the presence, locus and characteristics of the scatterers by analyzing the plurality of received beams. Each of the simultaneously transmitted beams are focused in a different direction by virtue of the fact that the antenna transmits beams of different frequencies in different directions, with the direction of each beam and the separation between beams being a function of the transmitted frequencies and the characteristics of the antenna.

42 Claims, 6 Drawing Sheets

RADAR SYSTEM HAVING MULTIPLE SIMULTANEOUSLY TRANSMITTED BEAMS OPERATING IN A SCANNING MODE TO IDENTIFY SCATTERERS

FIELD OF THE INVENTION

This invention relates to radar systems that simultaneously transmit and/or receive a plurality of beams of high frequency energy in a scanning mode to identify the presence, locus and characteristics of scatters in a region of space.

PROBLEM

It is a problem in the field of radar systems, and weather radar systems in particular, to implement an inexpensive system that collects sufficient data to provide accurate information to the users relating to the presence, locus and characteristics of scatters in a region of space, in a short period of time. Radar systems can be characterized in terms of the basic system architecture as either monostatic radar systems which use a single transmitter and receiver or bistatic radar network systems which use a single radar transmitter and a plurality of receivers, at least one of which is located remotely from the transmitter site.

Included in the field of monostatic radar systems are the standard narrow beam radar systems which transmit a single narrow beam of high frequency radiation, then receive signals, which constitute components of this narrow beam that have been reflected off scatterers located in the path of the beam. These systems usually include a mechanically driven antenna to execute a predetermined scan pattern that covers a predetermined volume of space. The scanning speed is limited by the ability to obtain independent meteorological samples using a single frequency and by the ability to mechanically move a large antenna, thereby preventing these systems from both scanning extremely rapidly and frequently revisiting particular regions of space. To increase the accuracy of the data produced by the narrow beam radar systems, expensive rotating high gain antennas are used. As a result, the cost of implementing, operating, and maintaining such systems is high. Furthermore, the accuracy of the data produced is adversely affected by the infrequent scan pattern of the rotating antenna. These narrow beam radar systems, when used as a weather radar, collect data that is indicative of only the radial component of the wind field present in the predetermined volume of space.

Included in the field of monostatic radar systems are the broad beam radar systems which transmit a single broad beam of high frequency radiation. These systems receive a plurality of signals, comprising the radiation that is reflected off a plurality of scatters located in the broad beam of the transmitted beam, using a receiving antenna or antennas that is/are sensitive to radiation from particular directions more than others. These broad beam radar systems can include a mechanically driven antenna to execute a predetermined scan pattern that covers a predetermined volume of space. The sensitivity of these systems is low due to the broad beam transmission. These systems are also adversely affected by the fact that radiation is received from outside the narrowly defined directions defined by the receiving antennas. These broad beam radar systems, when used as a weather radar, also collect data that is indicative of only the radial component of the wind field present in the predetermined volume of space.

One alternative in the field of monostatic radar systems are the "standard" rapid-scan technology radar systems that use phased-array antennas. In these radar systems, an array of emitters are used to sequentially focus a narrow beam of high frequency radiation in a certain direction, then the radar system receives the backscattered radiation from that direction. The emitters are then focused in a second direction, and the radar system receives the backscattered radiation from the second direction. This process is executed seriatim to cover a predetermined volume of space. In such a system, there is no simultaneous transmission of the plurality of beams of high frequency radiation or simultaneous reception of the backscattered radiation from the plurality of beams of high frequency radiation. The operation of this radar system is a sequential process, but the radar system has the advantage of being able to quickly focus in any direction, since the focus operation is accomplished electronically, rather than mechanically as in other scanning radar systems.

One example of such a multiple beam radar system is disclosed in the series of U.S. Pat. Nos. 5,130,712, 5,175, 551, 5,262,782, 5,359,330, 5,394,155, 5,442,359, 5,451,961 which disclose a stacked beam radar system for detecting microbursts in a predetermined region of space. The system uses a stacked beam antenna and a single pulse radar transmitter to output a pulse of radio frequency energy at a predetermined frequency. The system then uses a beam selector to interconnect a one of the plurality of elevationally stacked antenna beams to a coherent receiver. The beams are sequentially selected to provide a continuous elevation sector coverage and the antenna is then mechanically rotated in the azimuth direction.

An alternative to monostatic radar systems are the bistatic radar systems which use a single radar transmitter and a plurality of passive, low-gain receivers, at least one of which is located remotely from the transmitter site, such as is disclosed in U.S. Pat. No. 5,410,314, U.S. Pat. No. 5,469, 169, U.S. Pat. No. 5,471,211. In such a system, the transmitter produces a "pencil beam" of high frequency energy, which is reflected off scatterers as the rotating antenna scans the predetermined volume of space. The reflected radial component of the beam is received by a receiver located at the transmitter site, while other components of the reflected beam are received at other receivers located remote from the transmitter site. The bistatic radar system has the advantage of receiving backscattered reflections indicative of the radial component of the scatterer as well as other components, which enable the system to simply produce a three-dimensional determination of the characteristics of the scatters. This radar system is relatively inexpensive due to the use of the plurality of passive, low-gain receivers, but does require the use of an expensive mechanically driven antenna to execute a predetermined scan pattern that covers a predetermined volume of space. Furthermore, the system is limited in its ability to revisit particular locations in space since the transmitting antenna produces a single beam and is mechanically moved.

Thus, existing monostatic and bistatic radar systems are relatively expensive to implement, rely on a complex mechanically driven antenna to execute a predetermined scan pattern that covers a predetermined volume of space, and suffer from a low data refresh rate which limits the accuracy of the data that is produced.

SOLUTION

The above described problems are solved and a technical advance achieved in the field by the present multiple beam radar system, which uses multiple simultaneously transmitted beams of high frequency energy to identify scatterers that are located in a predetermined volume of space. This multiple beam radar system simultaneously transmits several beams of high frequency energy, produced by an antenna which operates in a mechanically scanning mode, and simultaneously receives the returned radiation, which constitutes components of this narrow beam that have been reflected off scatterers located in the path of the beam. The transmitted (and thus received) frequency of each beam is different, providing information relating to the presence, locus and characteristics of the scatterers by analyzing the plurality of received beams. Each of the simultaneously transmitted beams are focused in a different direction by virtue of the fact that the antenna transmits beams of different frequencies in different directions, with the direction of each beam and the separation between beams being a function of the transmitted frequencies and the characteristics of the antenna.

The present multiple beam radar system is much less expensive to implement than phased-array systems. This is because the multiple beams are produced by simultaneously transmitting different frequencies and because the beam scanning is conducted mechanically in one axis, typically an azimuthal direction. Contamination of signals from energy received from directions outside the received beams is reduced by virtue of the use of high gain (pencil-beam) transmit and receive beam patterns.

DETAILED DESCRIPTION

Figure 1:
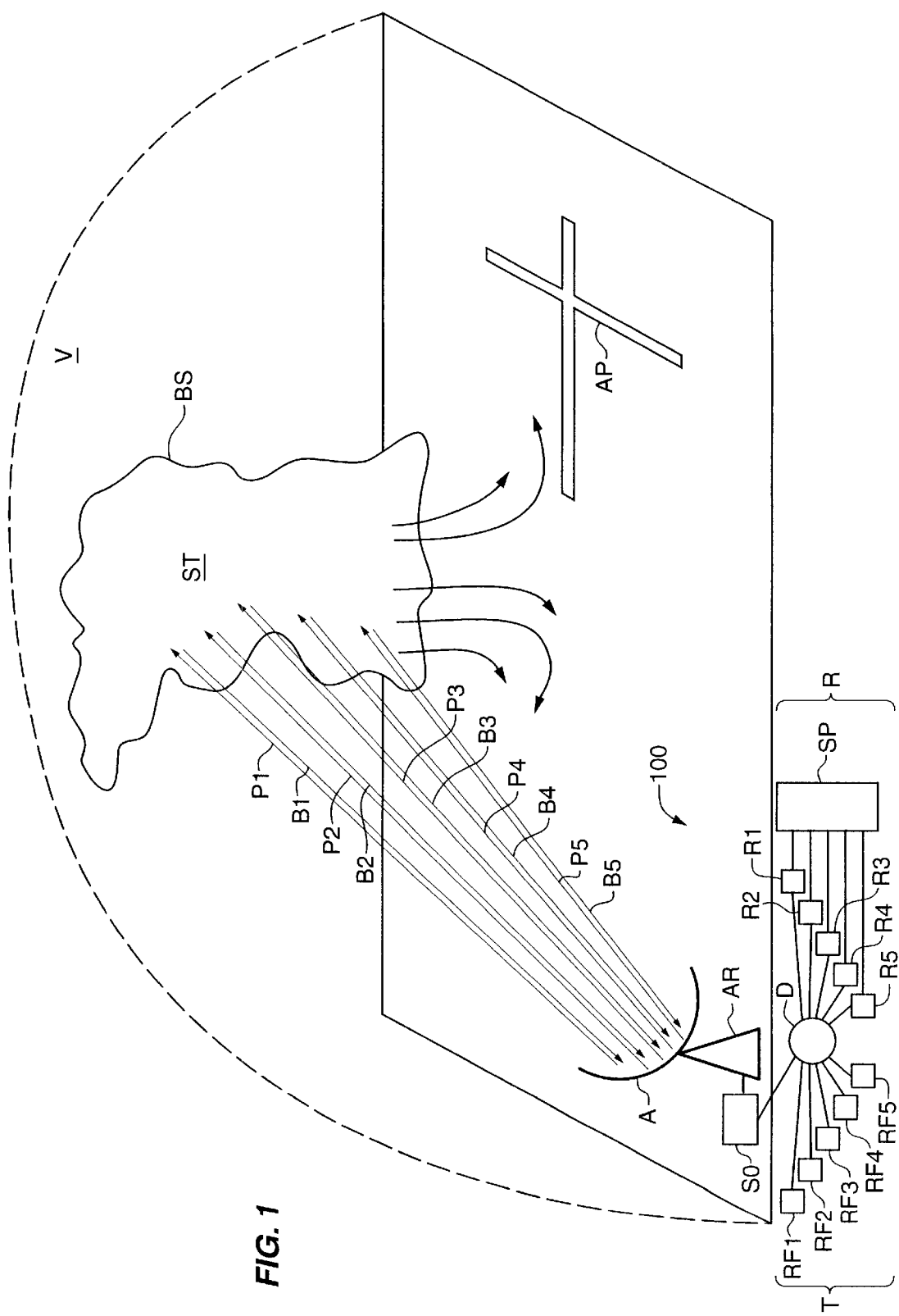
FIG. 1 illustrates in block diagram form the overall architecture of the present multiple beam electronically steered radar system.
Figure 3:
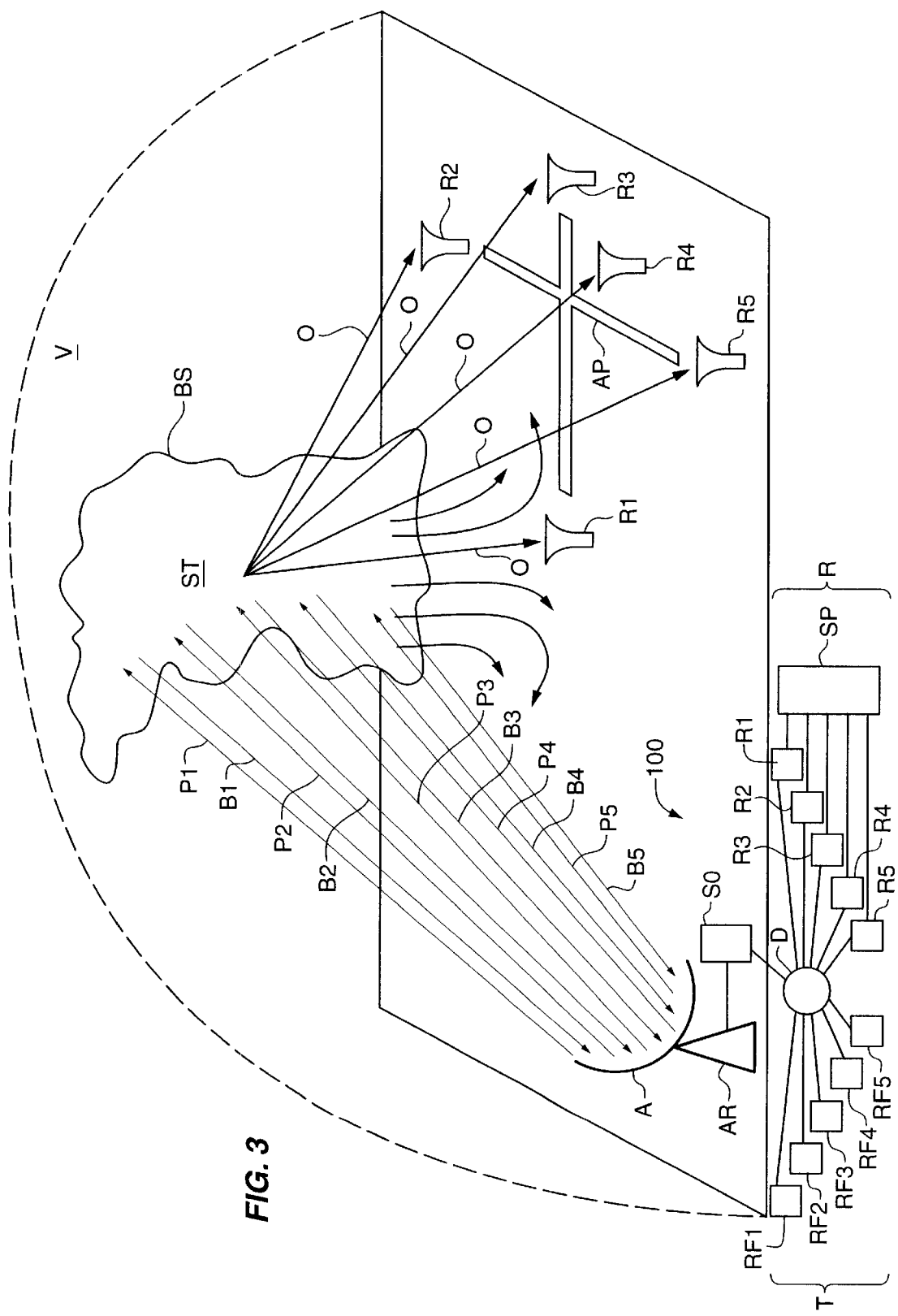
FIG. 3 illustrates in block diagram form the overall architecture of a bistatic network implementation of the present multiple beam electronically steered radar system.

The present multiple beam electronically steered radar system can be constructed using only a single radar transmitter which produces multiple, simultaneously transmitted beams of high frequency energy and one receiver located at the transmitter site, as illustrated in FIG. 1. Alternatively, the multiple beam electronically steered radar system can be constructed in a bistatic radar system configuration comprising a single radar transmitter which produces multiple, simultaneously transmitted beams of high frequency energy, one receiver located at the transmitter site, and at least one passive, low-gain receiver located remotely from the transmitter site, as illustrated in FIG. 3. These embodiments are presented for the purpose of illustrating the concepts of the present multiple beam electronically steered radar system and should not be construed as limiting in any way the applicability of the inventive concepts to other system configurations or implementations.

Weather Radar Fundamentals

Figure 5:
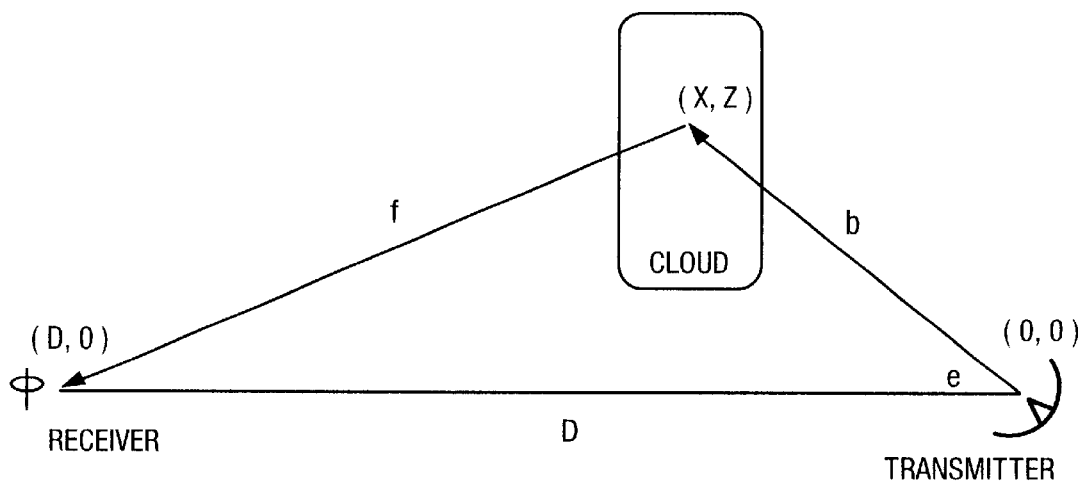
FIG. 5 illustrates the path geometry for directly transmitted and reflected radar pulses.

A plurality of narrow beams of high frequency energy emanating from a transmitting radar, result in returned radiation, which constitutes components of these narrow beams that have been reflected off scatterers located in the path of the beams. This returned radiation can be detected at the receivers as the beams penetrate weather targets. The Doppler shifts of the radiation received at the receiver(s) can be used to construct vector windfields in a manner similar to that used with traditional radar networks. The location of scatterers in Cartesian space can be calculated from location of the transmitter and receiver antennas, the time-tagged pointing angle of the transmitting antenna and the time between transmission from the active radar and detection at the receiver site. FIG. 5 illustrates the path geometry for directly transmitted and reflected radar pulses. The echo time samples may be correlated to a position along the beam P if the receiver R is synchronized with the transmitter T and has the pointing angle of the transmitter antenna A and the distance between the transmitter antenna A and the receiver antennas. The pointing angle and the location of the transmitter T define the beam path P, O through the sky relative to the receiver antenna. If the receiver is then time synchronized with the transmission of pulses from the transmitter T and knows the distance between transmitter and receiver antennas, the receiver can then determine the location along beam path P, O where each time sample of the echo signal originated.

System Architecture

The basic architecture of the multiple beam electronically steered radar system 100 is illustrated in block diagram form in FIG. 1. The system includes a pulsed Doppler radar transmitter T and a receiver R. The pulsed Doppler radar transmitter T generates a plurality of signals of high frequency energy via a plurality of radio frequency generators, five of which RF1–RF5 are shown by way of example. These radio frequency signals are then simultaneously combined by a diplexer D and the resultant signal forwarded to the signal output circuitry SO which drives the electronically steered antenna A. The transmitter T concurrently outputs a pulsed radar signal in the form of a plurality of "pencil beams", via an electronically steered antenna A, into a predetermined volume of space V which may be-located in close proximity to or around the Doppler radar transmitter T. The plurality of "pencil beams" are stacked in an elevation direction to scan a predetermined sector of the volume of interest V. The electronically steered antenna A can also be rotated in an azimuthal direction, typically by means of a mechanical antenna rotation mechanism AR to thereby scan at least a portion of the predetermined volume of space V. The scan pattern of the electronically steered antenna A can either be the full volume of space, around transmitter T or can be selected as a function of the topography around the Doppler radar transmitter site and the volume of interest V. The Doppler radar transmitter T can be of conventional design, such as the NEXRAD WSR88D or NCAR's CP-2 or other well-known scanning pulsed Doppler radar systems. The plurality of transmitted radar beams P1–P5, each consisting of a series of radio frequency pulses, are reflected off targets (scatterers) ST located in the predetermined volume V. One component B1–B5 of each of the reflected radar beams P1–P5 (back scattered) is received by the scanning electronically steered antenna A of the Doppler radar transmitter T.

As illustrated in FIG. 1, the volume of interest V is sited above and around an airport AP so that meteorological phenomena BS in this volume V that may impact airport operations can be detected. The radar transmitter T is typically located at a site somewhat distant from the airport AP so that the scan pattern of the scanning electronically steered antenna A is reduced from a full semi-spherical pattern to a narrow segment of a sphere. This reduced scan pattern enables the plurality of transmitted radar beams P1–P5 to more frequently probe the volume V. The plurality of transmitted radar beams P1–P5 that is scattered off various targets ST in the volume V must be detected by receiver R in order to obtain an accurate determination of the three-dimensional motion of the meteorological phenomena. The received energy from each frequency (beam) is processed separately by components R1–R5 of the receiver R and forwarded to an associated signal processor SP to obtain data relating to the presence, locus and characteristics of the scatterers. The resultant data are combined at some point for archiving, display, calculations, etc. Thus, there are separate results from each Rx/Sig processing chain. However, the data can be combined to calculate more sophisticated quantities, like 3D data, vertical real-time slices through weather, integrated quantities like vertical wind, etc.

Transmitter Antenna

The slotted waveguide antenna disclosed as the preferred embodiment herein consists of a plurality of radiating elements, each of which consists of a length of waveguide that is constructed to implement a multi-element antenna which produces a focused transmitter/receiver pattern to transmit and receive signals from only a segment of space (controlled field of view), rather than, for example, an omnidirectional antenna which receives signals from all directions without preference. Slot-antenna arrays are used as resonant and traveling wave antennas when precise amplitude and phase control are needed.

The slot is a commonly used radiator in antenna systems. The slot can be incorporated into the antenna feed system, such as a waveguide or stripline system without requiring a special matching network. Low-profile high gain antennas can be easily configured using slot radiators, although their inherent narrow frequency bandwidth can limit antenna performance in some applications. A slot cut into the waveguide wall which interrupts the flow of currents couples power from the waveguide modal field into free space. A singly moded waveguide is normally used for a slotted waveguide array design, and the spacing and/or orientation of the slots along the edge of the waveguide are used in order to control aperture illumination. A traveling waveguide slot array has five significant characteristics: the resonant slots are spaced by either more or less than one-half of the waveguide wavelength; the slotted waveguide should be terminated by a matched load; all slots in the array are resonant at the center frequency; the beam is off broadside and is frequency dependent; array efficiency is less than unity. Traveling wave slot antenna arrays are either uniformly spaced arrays to produce a low sidelobe pencil beam or nonuniformly spaced arrays to produce shaped beam patterns.

Figure 2:
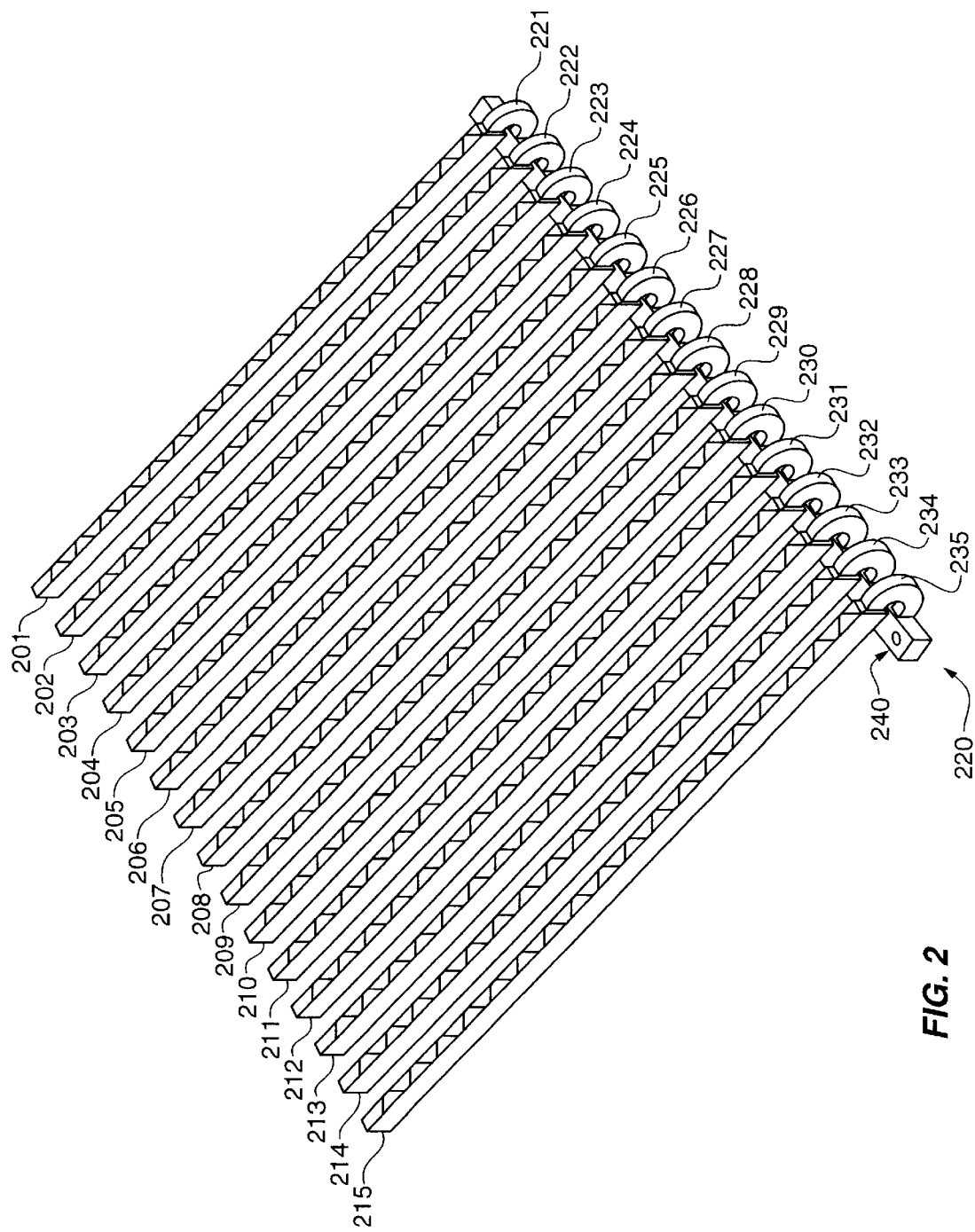
FIG. 2 illustrates a perspective view of a typical electronically steered antenna that can be used in the transmitter of the present multiple beam electronically steered radar system.

FIG. 2 illustrates additional details of one embodiment of the scanning electronically steered antenna A that can be used in this system to create the plurality of "pencil beams" P1–P5. The electronically steered antenna A consists of a plurality of radiator elements 201–215, typically arranged in a parallel, spaced apart relationship. These radiator elements 201–215 consist of traveling wave slotted waveguide radiators, with the number, dimensions and apertures formed therein being a function of the number of pencil beams P1–P5 generated and the frequency of operation of the system. The engineering details needed to create a specific antenna implementation are well known and are not discussed herein in the interest of brevity. Suffice it to say, in well known fashion the plurality of radiator elements 201–215 are crafted and interconnected to a traveling wave guide feed element 220 via feed couplers 221–235. The antenna input 240 represents the site at which the radio signal is input to the traveling wave guide feed element 220 of the scanning electronically steered antenna A. In operation, energy enters the traveling wave guide feed element 220 via the antenna input 240 and travels down the length of the traveling wave guide feed element 220. At each juncture of one of the feed couplers 221–235 with the traveling wave guide feed element 220, a predetermined percentage of the radio signal energy is diverted from the traveling wave guide feed element 220, through the feed couplers 221–235 and thence to the associated radiator elements 201–215. The distribution of the radio signal energy in this manner determines the shape of each of the plurality of the pencil beams P1–P5 in the H-plane. Each of the radiator elements 201–215 are identical and are optimized for frequency steering in the E-plane. The frequency steering arises from the radio signal dispersion in the radiator elements 201–215 and this dispersion can be adjusted by altering the cross-sectional dimensions of the radiator elements 201–215.

Signal Processing

This multiple beam radar system simultaneously transmits several beams of high frequency energy, produced by an antenna which operates in a mechanically scanning mode, and simultaneously receives the returned radiation, which constitutes components of this narrow beam that have been reflected off scatterers located in the path of the beam. The transmitted (and thus received) frequency of each beam is different, providing information relating to the presence, locus and characteristics of the scatterers by analyzing the plurality of received beams. Each of the simultaneously transmitted beams are focused in a different direction by virtue of the fact that the antenna transmits beams of different frequencies in different directions, with the direction of each beam and the separation between beams being a function of the transmitted frequencies and the characteristics of the antenna.

The term "simultaneous" as used herein is intended to indicate that the pencil beam are output at the same time or in rapid succession, such that the signal transmission is completed in a substantially simultaneous manner from the perspective of the data collection signal processing and the accuracy of the data produced. The processing of the received beams consisting of components of the plurality of transmitted pencil beams includes simultaneously receiving all of the components and using the data processing methodology noted below to produce the desired data.

Bistatic Radar Fundamentals

There are scientific advantages particular to the traditional bistatic radar systems: 1. Radial velocity measurements from individual pulse volumes are collected simultaneously at all the receivers since there is only one source of radiation. 2. The intensity of the obliquely scattered radiation can be compared to Rayleigh scattering predictions and used for hail detection. 3. Rapid scanning of localized weather phenomena can be aided by elimination of the need to scan with multiple radar transmitters. The bistatic radar system also has significant economic advantages. Passive receiver sites contain no high voltage transmitting equipment or large rotating antennas, and they also require no operators and much less maintenance than rotating antennas. The use of an electronically steered antenna at the transmitter further reduces the cost of implementation and reduces maintenance and operating costs, while providing a much faster scan rate.

There are shortcomings particular to bistatic radar networks: 1. Passive receiving sites have lower gain antennas (broader field of view) than scanning radar systems and are more sensitive to contamination from transmitter side-lobes and to secondary, or multiple scattering from weather echoes. 2. Lower gain receiving sites are less sensitive to weak weather echoes. 3. Cartesian (u, v, w) windfields derived from bistatic network data exhibit greater error components than those constructed from data from traditional monostatic networks containing equal numbers of radars when advection/evolution are not taken into account. Multiple scattering and side-lobe contamination levels are acceptable in most situations and can be reduced by the use of higher gain (narrower field of view) receiving antennas. The reduced sensitivity and increased error components of a bistatic network can be ameliorated by the use of multiple passive receiver sites, a practical solution due to their very low cost. In addition, the use of the multiple beam electronically steered radar provides increased resolution and rapid scanning.

The basic architecture of the multiple beam electronically steered radar system is illustrated in block diagram form in FIG. 3. The system includes a pulsed Doppler radar transmitter T and a plurality of receivers R1–R5, at least one of which is a passive, inexpensive receiver. The pulsed Doppler radar transmitter T generates a plurality of beams of high frequency energy that are concurrently output, via an electronically steered antenna A, into a predetermined volume of space V which may be located in close proximity to or around the Doppler radar transmitter T. The scan pattern of the electronically steered antenna A can either be the full volume of space around transmitter T or can be selected as a function of the topography around the Doppler radar transmitter site and the volume of interest V. The Doppler radar transmitter T can be of conventional design, such as the NEXRAD WSR88D or NCAR's CP-2 or other well-known scanning pulsed Doppler radar systems. The transmitted radar beams P, each consisting of a series of radio frequency pulses, are reflected off targets (scatterers) ST located in the predetermined volume V. One component B of the reflected radar beam (back scattered) is received by the scanning electronically steered antenna A of the Doppler radar transmitter T, while other components O of the reflected radar beam (obliquely scattered) are detected by the passive receivers R1–R5.

Figure 4:
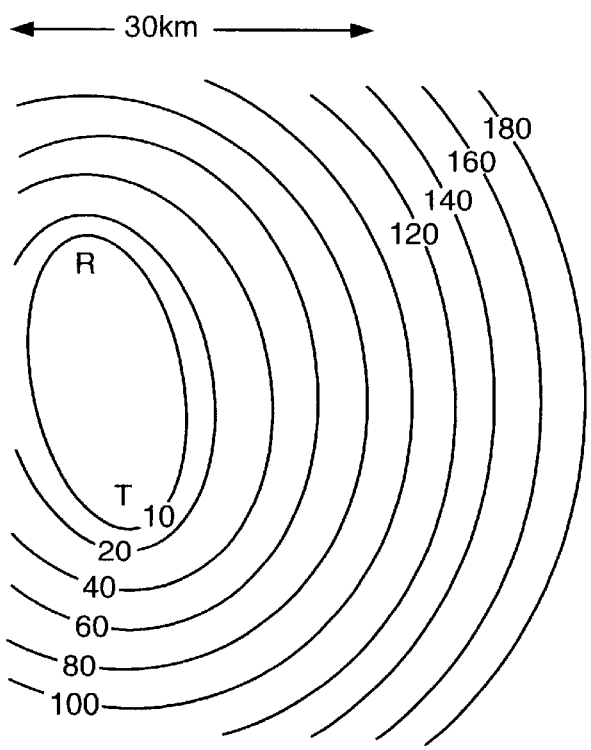
FIG. 4 illustrates a set of constant delay time surfaces that are found by the radar beam around a transmitter site and receiver site pair in a bistatic network.

In a Doppler radar system, the location of a scatterer ST in Cartesian space can be calculated from the time-tagged pointing angle of the transmitting antenna A and the time between transmission of a radar pulse at each of the plurality of frequencies from the radar transmitter T and detection of the reflected radar pulses at the receiver R. Surfaces of constant delay time form ellipsoids with loci at the transmitter site and the receiver site, as illustrated in cross-section view in FIG. 4 for a short-baseline system. The location of a scattering particle ST in the volume V, relative to the transmitter site, is specified by:

$$x = \frac{(ct)^2 - D^2}{2[ct - D\cos(p)]}\sin(a)\cos(e)$$

$$y = \frac{(ct)^2 - D^2}{2[ct - D\cos(p)]}\cos(a)\cos(e)$$

$$z = \frac{(ct)^2 - D^2}{2[ct - D\cos(p)]}\sin(e)$$

where p is the angle enclosed by the transmitter-scatterer and transmitter-receiver vectors, C is the speed of light, D is the distance between the transmitter site and the receiver site, and a and e are the azimuth and elevation angles relative to the transmitting radar antenna A. This formulation is illustrated schematically in FIG. 5 for the two-dimensional case (y=0). In this simplified case the angle p is equal to the elevation angle of the transmitter antenna A.

In bistatic radar systems, the length of effective radar resolution volumes [roughly proportional to $\partial$ (range along the transmitted beams)/ $\partial$ (delay time)] are not constant. This can be seen easily by contrasting the arrival time of radiation scattered from plurality of transmitted radar beams P1–P5 directed toward and away from the bistatic receiver along the transmitter-receiver baseline. All radiation scattered forward toward the receiver site arrives at the receiver simultaneously, regardless of the scatterers locations along the plurality of transmitted radar beams P1–P5 (all pathlengths are identical). In contrast, radiation back scattered toward the Doppler radar transceiver T is delayed by one microsecond for each 150 meter change in scatterer placement along the baseline. In this case, the effective length of resolution volumes is the same as that for a traditional monostatic weather radar. The same result occurs if the scatterers ST are off the baseline but are extremely distant from the bistatic radar network. At most transmission angles, near the bistatic couplet, but away from its baseline, the resolution-volume length is expanded by factors ranging from 1–4.

The reflectivity-weighted particle velocity can be retrieved at any point by solving the system of equations:

$$VR_i = u \sin(a_i)\cos(e_i) + v\cos(a_i)\cos(e_i) + w_p \sin(e_i), i=1,n$$

where $VR_i$ are the radial velocities measured by the n radars, ai and ei are the azimuth and elevation angles of the n radars, and u, v, wp are the Cartesian components of the particle velocity field. In dual-Doppler analyses the vertical air-parcel velocity wa is obtained through the integration of mass continuity. If measurements are available from more than three radars, and a reflectivity-terminal velocity relationship is assumed, the system of equations is over determined and can be solved by minimizing error.

Using the location of both the transmitter antenna A and receiver antenna S, the location of the target as defined by these variables can be determined when the radar echoes are received.

Accuracy

The variance and standard deviations of the estimates of (u, v, wp) in the three-radar network are expressed by:

$$\frac{1}{\sigma^2}\begin{bmatrix} a_1^2 & \beta_1^2 & y_1^2 \\ a_2^2 & \beta_2^2 & y_2^2 \\ a_1^2 & \beta_1^2 & y_1^2 \end{bmatrix}\begin{bmatrix} \sigma^2 VR_1 \\ \sigma^2 VR_2 \\ \sigma^2 VR_t \end{bmatrix} = \begin{bmatrix} \sigma u^2 \\ \sigma v^2 \\ \sigma^2 w_p \end{bmatrix}$$

Typical standard deviations in bistatic radar networks are twice that of monostatic radar networks consisting of comparable numbers of radars. Since the cost of bistatic radar receiving sites is very low, less than one-thirtieth of that of conventional transmitters, it is practical to deploy many passive receivers in a typical bistatic radar network. In this fashion, accurate wind fields can be retrieved at a much lower cost than with traditional systems. A ten receiver bistatic radar network provides comparatively accurate wind field synthesis. The vertical particle velocities are determined accurately to elevations below 2 km, allowing mid-level and low-level boundary conditions to be applied to the downward integration of mass continuity, thus avoiding common problems associated with the establishment of ground-level boundary conditions. The cost of such a radar network is less than that of a two monostatic transmitter radar network.

In the Rayleigh limit, the intensity of the radiation scattered obliquely from a transmitted radar beam varies with the scattering angle measured relative to the transmitted E vector such that $I\ I0\ \sin^2(\theta)$, where I is the intensity of the scattered radiation, Io is the intensity of the incident radiation, and $\theta$ is the angle between the incident E vector and the propagation vector of the scattered radiation. In addition, the bistatic geometry affects the size and shape of the resolution volumes as noted above. Therefore, modified versions of the traditional radar equation must be used. This angle-dependent scattering intensity strongly impacts the usefulness of bistatic radars and the choice of appropriate transmitter and receiver sites. If horizontally polarized radiation is transmitted, then there is a circular region at ground level from which there is very little scattering toward a particular receiver. This region is the locus of all points from which the E vector of transmitted beams points at the receiver.

The use of vertical polarization in the plurality of transmitted radar beams P1–P5 moves the low-sensitivity notch from the ground level to a vertical plane over the transmitter-receiver baseline. Bistatic systems that employ circular polarization have no low-sensitivity notch. While not nearly as sensitive as a traditional monostatic weather radar, the displayed bistatic configuration, using vertically polarized transmissions, provides a minimum sensitivity of 0–10 dBZ within the useful multiple-Doppler lobes and below –5 dBZ within 4 km of the receiving site. This is adequate for most purposes, but applications that require extreme sensitivity need to use higher-gain receiving antennas, say 25 dB, shorter transmitter-receiver baselines, or multiple receiver configurations to achieve sensitivities below –15 dBZ.

Frequency Coherence

In order to accurately determine the velocities perpendicular to the bistatic radar network's ellipsoidal delay time surfaces from the reflected radar pulses received at the remote bistatic receivers R1–R5, extremely accurate knowledge of the frequency of the transmitted radar pulses must be available. Errors of just 3 Hz result in velocity errors of approximately 0.15 m S$^{-1}$ (assuming 0.1-meter transmissions and ignoring the expansion of the frequency-velocity relationship near the transmitter-receiver baselines). This corresponds to a relative frequency error of only one part in 10$^9$. Traditional radar frequency sources, while extremely stable over typical transmit-receive delay times, may drift by much more than this over the longer term.

Solutions to this frequency coherence problem include the use of atomic frequency standards at the transmitter T and the receivers R1–R5, direct detection of the frequency of the transmitted pulses through sidelobe coupling or signals sent to the receivers R1–R5 through cables or the atmosphere, and the use of one common frequency standard for the transmitter T and receivers R1–R5.

Timing Coherence

In order to determine the location of resolution volumes accurately, the precise time of the transmission of the radar pulses from transmitter T must be known at all of the receivers R1–R5. To achieve suitable accuracy, this timing must be known within approximately 100 ns. This is particularly true near the transmitter-receiver baselines where effective resolution volumes are expanded.

There are several approaches to meeting this timing coherence requirement, falling into two main categories. In the first category, extremely accurate time is kept at both the transmitter T and receivers R1–R5 and data indicative of the pulse transmission time from the transmitter T is sent to all the receivers R1–R5. The information arrives at each receiver R1–R5 well after the obliquely scattered radiation O, but the pulse repetition frequency can be used to correlate the received radiation O with the pulse transmission time. In the second method, the transmitted pulse is detected directly at the receivers R1–R5. This direct radiation, from the existing sidelobes or through radiation beamed intentionally at the remote receiving antennas, always arrives before any scattered radiation and can be used to start a ranging clock.

Atomic clocks can provide extreme timing accuracy but drift relative to each other. Even though accurate within 1 part in 10$^{12}$, they tend to drift apart by roughly 100 ns per day and these clocks must be recalibrated frequently. Either as a method of recalibration or as an independent timing method, the arrival time of direct-path radiation from the sidelobes of the transmitter antenna A could be measured. This radiation may be difficult to detect in sheltered locations, thus complicating the accurate calculation of its arrival time.

The preferred method of achieving both timing and frequency coherence is to link the transmitter T and all the receivers R1–R5 to an external timing standard. Both Loran and Global Positioning Satellite (GPS) signals can provide the needed information, but only the GPS signals include time of day information so that the timing coherence can always be maintained without recalibration. Both signals can be used to achieve frequency coherence to well within one part in 10$^{10}$, (0.3 Hz at $\lambda$=0.1 m) if disciplined oscillators with high short-term stability are used.

Bistatic Radar Network Implementation

Figure 6:
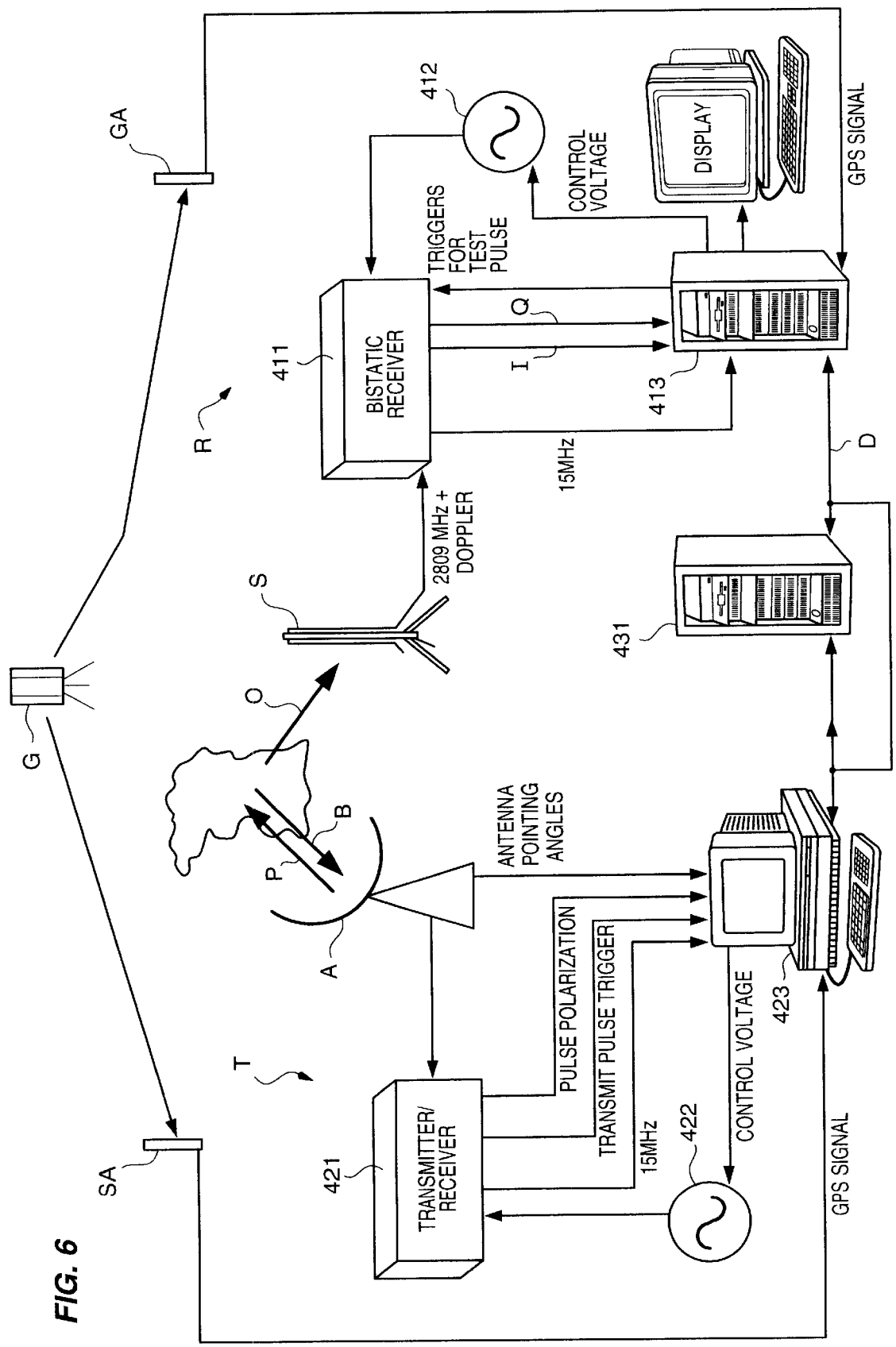
FIG. 6 illustrates in block diagram form additional details of the present multiple beam electronically steered radar system.

FIG. 6 illustrates a more detailed implementation of the bistatic radar network. For simplicity of description, only one passive receiver R is illustrated. Pulsed Doppler radar transmitter T scans a predefined volume of space using a stream of radar pulses P transmitted in a radial direction from the antenna A into the volume V. The antenna A follows a precisely controlled scan pattern to sweep all points in the predefined volume V with the radar beam P on a periodic basis. Once component B of the radar beam P is back scattered from a scatterer ST to antenna A along the transmit path while a second component O of the transmitted radar beam P is reflected at an oblique angle from the scatterer ST toward receiver R. Receiver R, being a passive element and not steerable, must detect the obliquely reflected component O and reject background noise as well as signals arriving from outside of the predefined volume V, and/or from regions of the predefined volume V that are not monitored by antenna S. In order to enhance the performance of receiver R, a directional antenna S is used to receive signals from only a segment of space, which segment included all or a portion of the predefined volume V. An excellent choice for the antenna S is a slotted waveguide antenna, which exhibits high gain in a predetermined direction and significantly lower gain elsewhere. The slots are arranged to produce a desired gain pattern which falls off steeply outside of the desired field of view.

The signals received by antenna S consist of base frequency signals (for example 2809 MHZ) with the superposition Doppler offset components related to the collective movement of the distributed targets illuminated by transmitter T at a particular location in space. These received signals are coupled to bistatic receiver 411 which is synchronized to the transmitter frequency and pulse transmission time for accuracy of ranging and gating. A precisely controlled oscillator 412 is used as a reference frequency source for bistatic receiver 411. The output frequency of oscillator 412 is controlled by processor 413 which receives reference signals from a number of sources. Timing antenna GA receives timing signals from a source G that is common to all receivers R1–R5 in the bistatic network. An example of such a common timing source G is the Global Positioning Satellites (GPS), which transmit signals of precise frequency. These signals are also time stamped. The received GPS signals are used by processor 413 to discipline oscillator 412 to maintain frequency coherence with the GPS reference, which in turn allows synthesis of signals coherent with transmitter T. The received GPS signals can also be used as a time reference to obtain synchronization with the transmitted radar pulses. A control processor 423 located at the transmitter T also receives GPS timing information and, in the particular example shown, disciplines timing reference oscillator 422 in identical fashion. It also generates data indicative of the time delay between the radar pulse and the GPS timing signals which occur at 1 pulse per second. This data is transmitted to the receiver R via a data link D and used at the receiver R to obtain timing synchronization with the radar pulses. Alternatively, the transmitter T can transmit pulses directly to receiver R in conjunction with the scan beam. In either case, the reference frequency output by oscillator 412 and timing synchronization information from processor 413 are used by bistatic receiver 411 to produce received pulse data I, Q indicative of the in-phase and quadrature components of the received radar echoes. This data and the timing data indicative of the time difference between the transmitted pulse and the received signals represent receiver data that are indicative of the locus of the scatterers. This data is stored in processor 413 and retrieved on a periodic basis by central processor 431, which uses this retrieved data from all the receivers and the time-tagged antenna pointing data to accurately identify the locus of the scatterers. Alternatively, processing can be distributed and processor 413 can perform many of the computation functions described below as performed by central processor 431.

In this particular example, timing antenna TA receives timing signals from a source that is common to all receivers R1–R5 in the bistatic network. An example of such a source is the GPS satellites, which transmit signals of precise frequency. These signals are also time stamped. The received GPS signals are used by processor 423 to discipline oscillator 422 to maintain frequency and timing coherence with the remainder of the bistatic network. The reference frequency output by oscillator 422 and timing synchronization information from processor 423 are used by transceiver 421 to produce the frequency coordinated transmit pulse and received radar echo data I, Q, indicative of the in-phase and quadrature components of the received signals. In addition, antenna A outputs antenna point angle information regarding the precise direction that the transmitted radar beam P is output by antenna A. This data is stored in processor 423 and retrieved on a periodic basis by central processor 431.

Alternatively, processing can be distributed and processor 423 can perform many of the computation functions performed by central processor 431.

The central processor 431 can be connected via data links to all the receivers R1–R5 and transmitter T that form the bistatic network. The data received from these elements represent the information that defines the path of the transmitted radar beam as well as the paths that the received reflected components traversed. The timing information associated with each of the received signals are indicative of the distance of the target from the receivers R1–R5 and transmitter T. This data is used by central processor 431 to compute the locus and motion vectors for the detected target.

Slotted Waveguide Antenna

Figure 7:
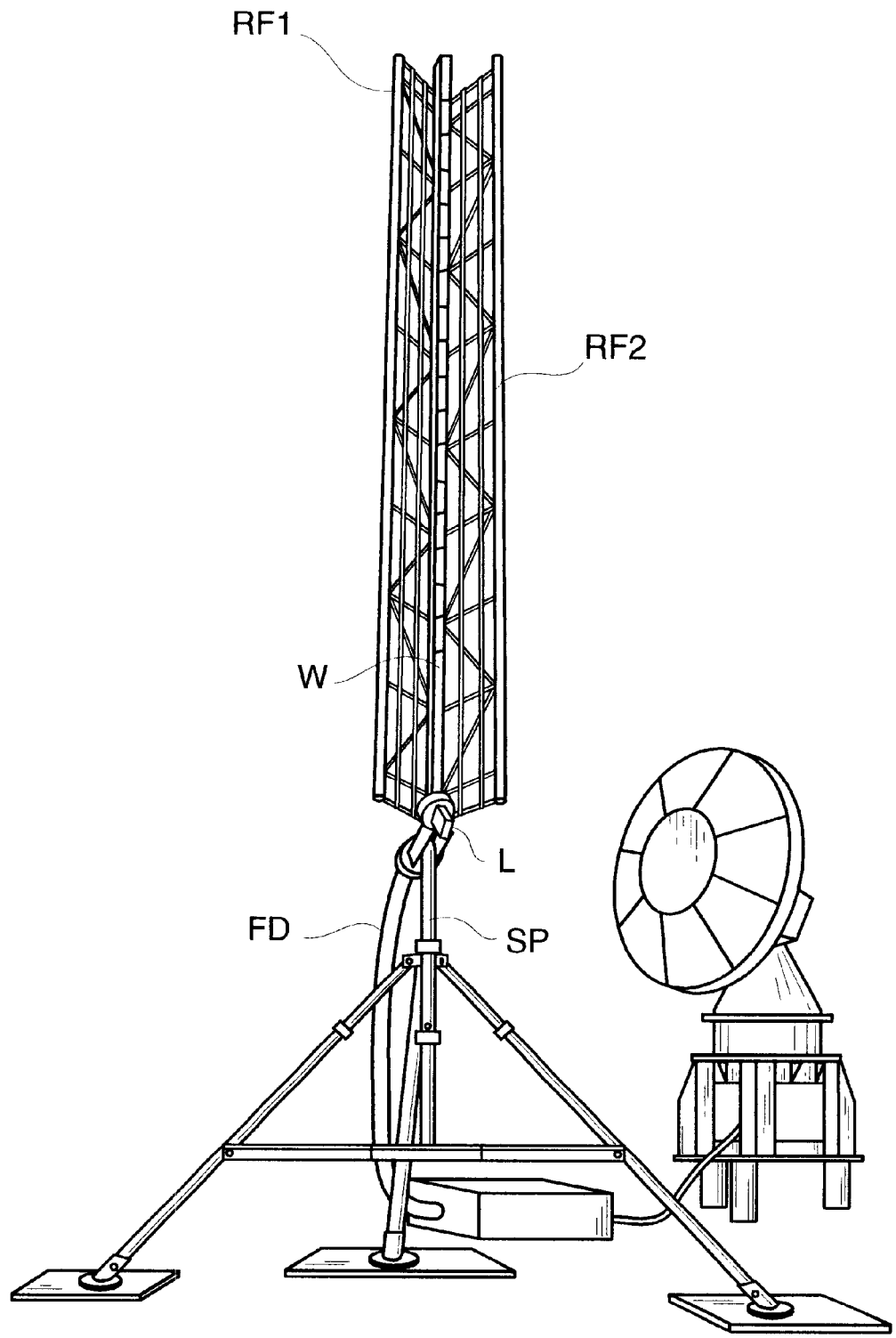
FIG. 7 illustrates a perspective view of a typical receiver antenna that can be used in the bistatic network implementation of the present multiple beam electronically steered radar system.

FIG. 7 illustrates a perspective view of a typical receiver antenna that can be used in the bistatic network implementation of the present multiple beam electronically steered radar system. For the purpose of the preferred embodiment of the bistatic network, the antenna criteria are: a (vertically) polarized beam to match the transmitter radar polarization, a beam pattern that exhibits a sharp reduction in gain for elevation angles above and below the desired field of view, a broad azimuthal pattern and relatively low sidelobes. A preferred pattern has sidelobes of below 20 dB from the horizon down to below the ground, a flat top pattern from the horizon to some selected elevation angle, sidelobes below 20 dB from this elevation angle up to zenith. As an example, to implement this antenna, using a slotted waveguide, a 4 meter long element was constructed using 58 uniformly spaced slots machined therein. The resultant gain is 13 dB and the antenna exhibits an elevation beam width of 20 degrees and an azimuthal beamwidth of approximately 160 degrees. FIG. 7 illustrates the antenna having a top fed antenna, so the waveguide FD is simply the input power feed and the segment W represents the active element that contains the precisely machined slots to produce the desired antenna pattern. The segment W of the antenna is terminated by a load L. A support SP is provided for mounting segment W, with its reflectors RF1 & RF2, and waveguide FD in the proper position and attitude.

Summary

The multiple beam radar system uses multiple simultaneously transmitted beams of high frequency energy to identify scatterers that are located in a predetermined volume of space. This multiple beam radar system simultaneously transmits several beams of high frequency energy, produced by an antenna which operates in a mechanically scanning mode, and simultaneously receives the returned radiation, which constitutes components of this narrow beam that have been reflected off scatterers located in the path of the beam. The transmitted (and thus received) frequency of each beam is different, providing information relating to the presence, locus and characteristics of the scatterers.

What is claimed:

1. A radar system for determining the presence, locus, and characteristics of scatterers in a predefined space, said radar system comprising:

means for substantially simultaneously transmitting a plurality of focused beams of high frequency energy into said predefined space using an antenna, with each of said plurality of focused beams of high frequency energy being propagated in different directions as a function of a predetermined frequency used to generate each of said plurality of focused beams of high frequency energy, and comprising a series of pulses, each pulse having a pulse origination time and direction of propagation as it is emanated from said antenna;

means for determining pulse origination data for said pulses emanating from said transmitter for each of said plurality of focused beams of high frequency energy;

means for scanning said antenna in a predetermined scan pattern in at least an azimuthal direction; and means, responsive to receipt of said determined pulse origination data and receipt of components of said plurality of substantially simultaneously transmitted focused beams of high frequency energy that are reflected from scatterers in said predefined space, for generating data indicative of presence, locus, and characteristics of said scatterers in said predefined space.

2. The radar system of claim 1 wherein said means for determining pulse origination data of said pulses emanating from said transmitter for each of said plurality of focused beams of high frequency energy, comprises:

means for generating data indicative of azimuth and elevation of said plurality of focused beams of high frequency energy as they are emanated from said antenna; and means for generating data indicative of a location of the beam in space of each of said plurality of focused beams of high frequency energy.

3. The radar system of claim 2 wherein said means for generating comprises:

means for computing a scatterer locus using each of said plurality of focused beams of high frequency energy that are reflected from scatterers in said predefined space.

4. The method of operating a radar system of claim 2 wherein said step of generating comprises:

computing a scatterer locus using each of said plurality of focused beams of high frequency energy that are reflected from scatterers in said predefined space.

5. The radar system of claim 1 wherein said means for generating comprises:

means for storing said received determined pulse origination data and components of said plurality of focused beams of high frequency energy that are reflected from scatterers in said predefined space; and means for periodically processing said stored data to determine presence, locus, and characteristics of said scatterers in said predefined space.

6. The radar system of claim 1 wherein said means for transmitting comprises:

means for generating a plurality of signals of high frequency energy, which differ from each other by a predetermined frequency difference; and means for forming said plurality of focused beams of high frequency energy by applying said plurality of signals of high frequency energy to said antenna.

7. The radar system of claim 6 wherein said means for transmitting further comprises:

means for steering said plurality of focused beams of high frequency energy by changing a frequency difference between each of said plurality of focused beams of high frequency energy.

8. The radar system of claim 6 wherein said means for transmitting further comprises:

means for mechanically scanning said antenna through an azimuth scan pattern while controllably incrementing an elevation of said antenna.

9. The radar system of claim 6 wherein said means for transmitting further comprises:

means for mechanically scanning said antenna through an elevation scan pattern while controllably incrementing an azimuth of said antenna.

10. The radar system of claim 1 wherein said antenna comprises:

a dual polarization, slotted waveguide array antenna.

11. The radar system of claim 10 where the angle that the transmitted beams are determined by the frequency of the radiation of the transmitted beams.

12. The radar system of claim 10 where the angle of maximum sensitivity to received radiation is determined by the frequency of the received radiation.

13. The method of operating a radar system of claim 1 wherein said step of transmitting comprises:

generating a plurality of signals of high frequency energy, which differ from each other by a predetermined frequency difference; and forming said plurality of focused beams of high frequency energy by applying said plurality of signals of high frequency energy to said antenna.

14. The method of operating a radar system of claim 13 wherein said step of transmitting further comprises:

steering said plurality of focused beams of high frequency energy by changing a frequency difference between each of said plurality of focused beams of high frequency energy.

15. The method of operating a radar system of claim 13 wherein said step of transmitting further comprises:

mechanically scanning said antenna through an azimuth scan pattern while controllably incrementing an elevation of said antenna.

16. The method of operating a radar system of claim 13 wherein said step of transmitting further comprises:

mechanically scanning said antenna through an elevation scan pattern while controllably incrementing an azimuth of said antenna.

17. A radar system for determining the presence, locus, and characteristics of scatterers in a predefined space, wherein a timing source broadcasts deterministic timing signals, said radar system comprising:

means for substantially simultaneously transmitting a plurality of focused beams of high frequency energy into said predefined space using an antenna, with each of said plurality of focused beams of high frequency energy being propagated in different directions as a function of a predetermined frequency used to generate each of said plurality of focused beams of high frequency energy, and comprising a series of pulses, each pulse having a pulse origination time and direction of propagation as it is emanated from said antenna;

means for receiving said deterministic timing signal, means, using said deterministic timing signal, for determining pulse origination data for said pulses emanating from said transmitter for each of said plurality of focused beams of high frequency energy;

means for scanning said antenna in a predetermined scan pattern in at least an azimuthal direction;

a plurality of receivers, each comprising:

means for receiving said deterministic timing signal, and means, responsive to receipt of said determined pulse origination data and receipt of components of said plurality of simultaneously transmitted focused beams of high frequency energy that are reflected from scatterers in said predefined space, for generating data indicative of presence, locus, and characteristics of said scatterers in said predefined space.

18. The radar system of claim 17 wherein said means for determining pulse origination data of said pulses emanating from said transmitter for each of said plurality of focused beams of high frequency energy, comprises:

means for generating data indicative of azimuth and elevation of said plurality of focused beams of high frequency energy as they are emanated from said antenna; and means for generating data indicative of a location of the beam in space of each of said plurality of focused beams of high frequency energy.

19. The radar system of claim 18 wherein said means for generating comprises:

means for computing a scatterer locus using each of said plurality of focused beams of high frequency energy that are reflected from scatterers in said predefined space.

20. The radar system of claim 17 further comprising:

means for forwarding said determined pulse origination data to at least one receiver located at a site remote from said transmitter means; and means, responsive to receipt from a plurality of said at least one receiver means of said generated data indicative of a locus of said scatterers in said predefined space, for determining a locus of said scatterers in said predefined space.

21. The radar system of claim 17 wherein said means for generating comprises:

means for storing said received determined pulse origination data and components of said plurality of focused beams of high frequency energy that are reflected from scatterers in said predefined space; and means for periodically processing said stored data to determine presence, locus, and characteristics of said scatterers in said predefined space.

22. The radar system of claim 17 wherein said means for transmitting comprises:

means for generating a plurality of signals of high frequency energy, which differ from each other by a predetermined frequency difference; and means for forming said plurality of focused beams of high frequency energy by applying said plurality of signals of high frequency energy to said antenna.

23. The radar system of claim 22 wherein said means for transmitting further comprises:

means for steering said plurality of focused beams of high frequency energy by changing a frequency difference between each of said plurality of focused beams of high frequency energy.

24. The radar system of claim 22 wherein said means for transmitting further comprises:

means for mechanically scanning said antenna through an azimuth scan pattern while controllably incrementing an elevation of said antenna.

25. The radar system of claim 22 wherein said means for transmitting further comprises:

means for mechanically scanning said antenna through an elevation scan pattern while controllably incrementing an azimuth of said antenna.

26. The radar system of claim 17 wherein said antenna comprises:

a dual polarization, slotted waveguide array antenna.

27. The radar system of claim 26 where the angle that the transmitted beams are determined by the frequency of the radiation of the transmitted beams.

28. The radar system of claim 26 where the angle of maximum sensitivity to received radiation is determined by the frequency of the received radiation.

29. A method of operating a radar system for determining the presence, locus, and characteristics of scatterers in a predefined space, said radar system comprising the steps of:

substantially simultaneously transmitting a plurality of focused beams of high frequency energy into said predefined space from a transmitter using an antenna, with each of said plurality of focused beams of high frequency energy being propagated in different directions as a function of a predetermined frequency used to generate each of said plurality of focused beams of high frequency energy, and comprising a series of pulses, each pulse having a pulse origination time and direction of propagation as it is emanated from said antenna;

determining pulse origination data for said pulses emanating from said transmitter for each of said plurality of focused beams of high frequency energy;

scanning said antenna in a predetermined scan pattern in at least an azimuthal direction; and generating, in response to receipt of said determined pulse origination data and receipt of components of said plurality of substantially simultaneously transmitted focused beams of high frequency energy that are reflected from scatterers in said predefined space, data indicative of presence, locus, and characteristics of said scatterers in said predefined space.

30. The method of operating a radar system of claim 29 wherein said step of determining pulse origination data of said pulses emanating from said transmitter for each of said plurality of focused beams of high frequency energy, comprises:

generating data indicative of azimuth and elevation of said plurality of focused beams of high frequency energy as they are emanated from said antenna; and generating data indicative of a location of the beam in space of each of said plurality of focused beams of high frequency energy.

31. The method of operating a radar system of claim 29 wherein said step of generating comprises:

storing said received determined pulse origination data and components of said plurality of focused beams of high frequency energy that are reflected from scatterers in said predefined space; and periodically processing said stored data to determine presence, locus, and characteristics of said scatterers in said predefined space.

32. The method of operating a radar system of claim 29 further comprising the step of:

determining the angle of the transmitted beams by controlling the frequency of the radiation of the transmitted beams.

33. A method of operating a radar system for determining the presence, locus, and characteristics of scatterers in a predefined space, wherein a timing source broadcasts deterministic timing signals, said radar system comprising the steps of:

substantially simultaneously transmitting a plurality of focused beams of high frequency energy into said predefined space using an antenna, with each of said plurality of focused beams of high frequency energy being propagated in different directions as a function of a predetermined frequency used to generate each of said plurality of focused beams of high frequency energy, and comprising a series of pulses, each pulse having a pulse origination time and direction of propagation as it is emanated from said antenna;

receiving said deterministic timing signal;

determining, using said deterministic timing signal, pulse origination data for said pulses emanating from said transmitter for each of said plurality of focused beams of high frequency energy;

scanning said antenna in a predetermined scan pattern in at least an azimuthal direction;

operating a plurality of receivers by:
- receiving said deterministic timing signal, and
- generating, in response to receipt of said determined pulse origination data and receipt of components of said plurality of simultaneously transmitted focused beams of high frequency energy that are reflected from scatterers in said predefined space, data indicative of presence, locus, and characteristics of said scatterers in said predefined space.

34. The method of operating a radar system of claim 33 wherein said step of determining pulse origination data of said pulses emanating from said transmitter for each of said plurality of focused beams of high frequency energy, comprises:

generating data indicative of azimuth and elevation of said plurality of focused beams of high frequency energy as they are emanated from said antenna; and generating data indicative of a location of the beam in space of each of said plurality of focused beams of high frequency energy.

35. The method of operating a radar system of claim 34 wherein said step of generating comprises:

computing a scatterer locus using each of said plurality of focused beams of high frequency energy that are reflected from scatterers in said predefined space.

36. The method of operating a radar system of claim 33 further comprising:

forwarding said determined pulse origination data to at least one receiver located at a site remote from said transmitter; and determining, in response to receipt from a plurality of said at least one receiver of said generated data indicative of a locus of said scatterers in said predefined space, a locus of said scatterers in said predefined space.

37. The method of operating a radar system of claim 33 wherein said step of generating comprises:

storing said received determined pulse origination data and components of said plurality of focused beams of high frequency energy that are reflected from scatterers in said predefined space; and periodically processing said stored data to determine presence, locus, and characteristics of said scatterers in said predefined space.

38. The method of operating a radar system of claim 33 wherein said step of transmitting comprises:

generating a plurality of signals of high frequency energy, which differ from each other by a predetermined frequency difference; and forming said plurality of focused beams of high frequency energy by applying said plurality of signals of high frequency energy to said antenna.

39. The method of operating a radar system of claim 38 wherein said step of transmitting further comprises:

steering said plurality of focused beams of high frequency energy by changing a frequency difference between each of said plurality of focused beams of high frequency energy.

40. The method of operating a radar system of claim 38 wherein said step of transmitting further comprises:

mechanically scanning said antenna through an azimuth scan pattern while controllably incrementing an elevation of said antenna.

41. The method of operating a radar system of claim 38 wherein said step of transmitting further comprises:

mechanically scanning said antenna through an elevation scan pattern while controllably incrementing an azimuth of said antenna.

42. The method of operating a radar system of claim 33 further comprising the step of:

determining the angle of the transmitted beams by controlling the frequency of the radiation of the transmitted beams.

* * * * *